United States Patent [19]

Krichever et al.

[11] Patent Number: 5,254,844
[45] Date of Patent: *Oct. 19, 1993

[54] MIRRORLESS SCANNERS WITH MOVABLE LASER, OPTICAL AND SENSOR COMPONENTS

[75] Inventors: Mark J. Krichever, Hauppauge; Boris Metlitsky, Stony Brook; Edward D. Barkan, South Setauket; Howard M. Shepard, Great River; Jerome Swartz, Old Field, all of N.Y.

[73] Assignee: Symbol Technologies, Inc., Bohemia, N.Y.

[*] Notice: The portion of the term of this patent subsequent to Sep. 1, 2009 has been disclaimed.

[21] Appl. No.: 823,588

[22] Filed: Jan. 17, 1992

Related U.S. Application Data

[63] Continuation of Ser. No. 626,612, Dec. 7, 1990, abandoned, which is a continuation of Ser. No. 193,265, May 11, 1988, Pat. No. 5,144,120.

[51] Int. Cl.⁵ .............................................. G06K 7/10
[52] U.S. Cl. .................................... 235/462; 235/470; 235/472
[58] Field of Search ......................... 235/470, 472, 462; 250/234, 235; 359/205, 210

[56] References Cited

U.S. PATENT DOCUMENTS

| | | | |
|---|---|---|---|
| 2,138,875 | 12/1938 | Messner | 116/202 X |
| 3,244,886 | 4/1966 | Zuckerbrann | 250/235 X |
| 3,448,284 | 6/1969 | Friesecke | 250/235 X |
| 4,409,470 | 10/1983 | Shepard et al. | 235/472 |
| 4,578,571 | 3/1986 | Williams | 235/472 |
| 4,652,750 | 3/1987 | Eastman et al. | 235/472 X |
| 4,712,887 | 12/1987 | Baer | 359/210 |
| 4,831,275 | 5/1989 | Drucker | 235/472 X |
| 4,841,129 | 6/1989 | Tawara et al. | 235/472 |

FOREIGN PATENT DOCUMENTS

0264956 4/1988 European Pat. Off.

*Primary Examiner*—John Shepperd

[57] ABSTRACT

In bar code symbol scanning systems employing laser, optical and sensor components, a mirrorless scanner arrangement mounts one or more of these components on a drive for repetitive reciprocating movement either about an axis or in a plane to effect scanning.

32 Claims, 8 Drawing Sheets

MIRRORLESS SCANNERS WITH MOVABLE LASER, OPTICAL AND SENSOR COMPONENTS

This is a continuation of application Ser. No. 07/626,612 filed 7 Dec. 1990, now abandoned, which was a continuation of application Ser. No. 07/193,265 filed 11 May 1988, now U.S. Pat. No. 5,144,120.

BACKGROUND OF THE INVENTION

1. Field of the Invention

This invention generally relates to laser systems for reading indicia of different light reflectivity such as bar code symbols and, more particularly, to so-called mirrorless scanner systems wherein system components, other than mirrors, are employed to effect sweeping or scanning of symbols to be read.

2. Description of Related Art

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804 4,816,661; 4,760,248; 4,871,904; 4,806,742; 4,845,350, as well as U.S. Pat. Nos. 148,669 and 147,708 all of said patents and patent applications being owned by the assignee of the instant invention and being incorporated by reference herein--have generally been designed to read indicia having parts of different light reflectivity, e.g. bar code symbols, particularly of the Universal Product Code (UPC) type, at a certain working or reading distance from a hand-held or stationary scanner.

Typically, a light source such as a laser generates a light beam which is optically modified to form a beam spot of a certain size at the working distance and is directed by optical components along a light path toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component is situated in the light path. The scanning component may either sweep the beam spot across the symbol and trace a scan line across and past the symbol, or scan the field of view of the photodetector, or do both.

In any case, the scanner typically includes a moving mirror. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed, of a generally concave mirror portion and a generally planar mirror portion, the multi-mirror construction being repetitively and reciprocally driven in alternate circumferential directions about a drive shaft on which the multi-mirror construction was mounted.

No matter what the shape or orientation of the mirror, the known scanning components employed in laser scanning systems moved mirrors to perform the aforementioned sweeping and scanning actions. Moving other laser scanning system components was not thought to be practical. Thus, moving a gas laser tube was unthinkable, particularly in hand-held, compact system applications, due to the large size and the requisite large room necessary to accommodate a moving gas laser tube. Moving an optical lens was also not thought to be desirable, because optical alignment is critical in laser scanning systems. Hence, it was the mirror that was typically designated to effect the sweeping/scanning functions. However, in some laser scanning applications, mirror movements have not been found to be altogether desirable.

In non-laser scanning systems of the type exemplified by U.S. Pat. No. 4,578,571, a non-laser light emitting diode, an optical assembly, a photodetector, and electronic preamplifier/filter circuitry are all fixedly mounted on a common support that is connected to a cantilevered bimorph which is reciprocatingly driven to jointly move all the aforementioned components back and forth over a bar code symbol to be scanned. The large volume and heavy mass of all the commonly-mounted non-laser system components requires the expenditure of a great deal of power for the drive. This is not altogether practical in those cases, e.g. battery-powered operation, where power consumption is to be held to a minimum. Also, moving only one or more non-mirrored system components relative to another for conserving power was heretofore not considered desirable, because of the optical alignment problems described above.

SUMMARY OF THE INVENTION

1. Objects of the Invention

It is a general object of this invention to advance the state of the art of scanner systems for reading indicia of different light reflectivity, particularly laser scanner systems for reading bar code symbols.

Another object of this invention is to eliminate the use and the movement of mirrors to effect sweeping and scanning actions.

A further object of this invention is to provide a so-called "mirrorless" scanner system which is compact in size, light in weight, reliable in use, and relatively inexpensive to assemble and manufacture.

Still another object of this invention is to move one or more scanner system components either jointly or separately relative to one another to effect the sweeping and scanning actions.

Yet another object of this invention is to employ the mirrorless scanner system in a plurality of hand-held, desk-top workstation or built-in system configurations.

A still further object of this invention is to employ the mirrorless scanner system in a plurality of scanning modes, such as single and multi-axis scanning.

2. Features of the Invention

In keeping with these objects, and others which will bcome apparent hereinafter, one feature of this invention resides, briefly stated, in a mirrorless scanner arrangement in a light scanning system for reading indicia having parts of different light reflectivity, e.g. bar code symbols having alternating bars and spaces. The system is of the general type which includes a light source component, e.g. a laser, for emitting a laser light beam; an optical component, e.g. a focusing lens and/or an aperture stop, for optically modifying and directing the laser beam along an optical path toward the symbol located in the vicinity of a reference plane exteriorly of the system; and a photodetector component, e.g. a photodiode, having a field of view and operative for detecting at least a portion of light of variable intensity along a return path reflected off the symbol, and for generating an electrical signal indicative of the detected light intensity. This electrical signal is thereupon processed and converted to data descriptive of the symbol.

In accordance with this invention, the mirrorless scanner arrangement includes means for mounting at least one of the components for repetitive, reciprocating movement relative to at least another of the components, as well as drive means for repetitively, reciprocatingly moving the mounting means and said at least one component to scan at least one of said light beam and said field of view. Only one or only two of said components can advantageously be reciprocated relative to said other components. In addition, all the components can be jointly reciprocated, in which event, it is advantageous if the optical and return paths are co-linear, at least within a housing in which all the aforementioned components are housed.

Advantageously, the drive means includes a motor having an elongated shaft, and operative for reciprocatingly turning the shaft about an axis which extends along the elongation of the shaft in alternate circumferential directions over arc lengths less than 360°, e.g. 10° to either side of a center position. Said at least one component is mounted on the shaft for joint turning movement therewith.

The component mounted on the shaft may be the laser, e.g. a semiconductor laser diode, a focusing lens, an aperture stop, the combination of a focusing lens and an aperture stop, or the entire combination of the diode, the lens and the aperture stop. Also, the photodiode could be mounted on the shaft for joint turning movement therewith. Since the diode requires a power supply, e.g. a 12-volt DC source, and since the electrical signal developed by the photodiode must be conveyed to signal processing circuitry, electrical coiled tensile wires are advantageously connected to the laser diode and the photodiode.

Rather than turning the aforementioned components about an axis, the drive means may also be operative to reciprocatingly move one or more of said components in a plane which is perpendicular to an optical axis along which the optical path extends in a center position. Such planar movement can be effected by many types of drives, e.g. an electromagnetic drive, a mechanical drive, a piezoelectric drive, and a bi-metallic heating drive.

The mirrorless scanner arrangement of this invention can be used to generate a single scan line over the symbol to be read, or can be used with other scanner components to generate a multi-line scan pattern over the symbol.

In addition, the mirrorless scanner arrangement is very compact in size and light in weight, and can be mounted in modular manner in many different system configurations. For example, the arrangement can be mounted in hand-held housings having any convenient shape, e.g. a gun-shaped head having a barrel and a handle, or a box-like head, or a cylindrical-type head, or in desk-top housings, e.g. a workstation having scan-above, scan-down, or scan-sideways capabilities, or in stationary system installations, e.g. mounted at a production line or at a cash register. The compact size and lightweight characteristic renders the arrangement very versatile for multiple applications and uses. The power requirements for reciprocating the one or more components to be reciprocated is minimal. Advantageously, the arrangement is easily removable from the system in which it is installed. An arrangement requiring replacement is easily interchangeable with another.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figures 1A, 1B:
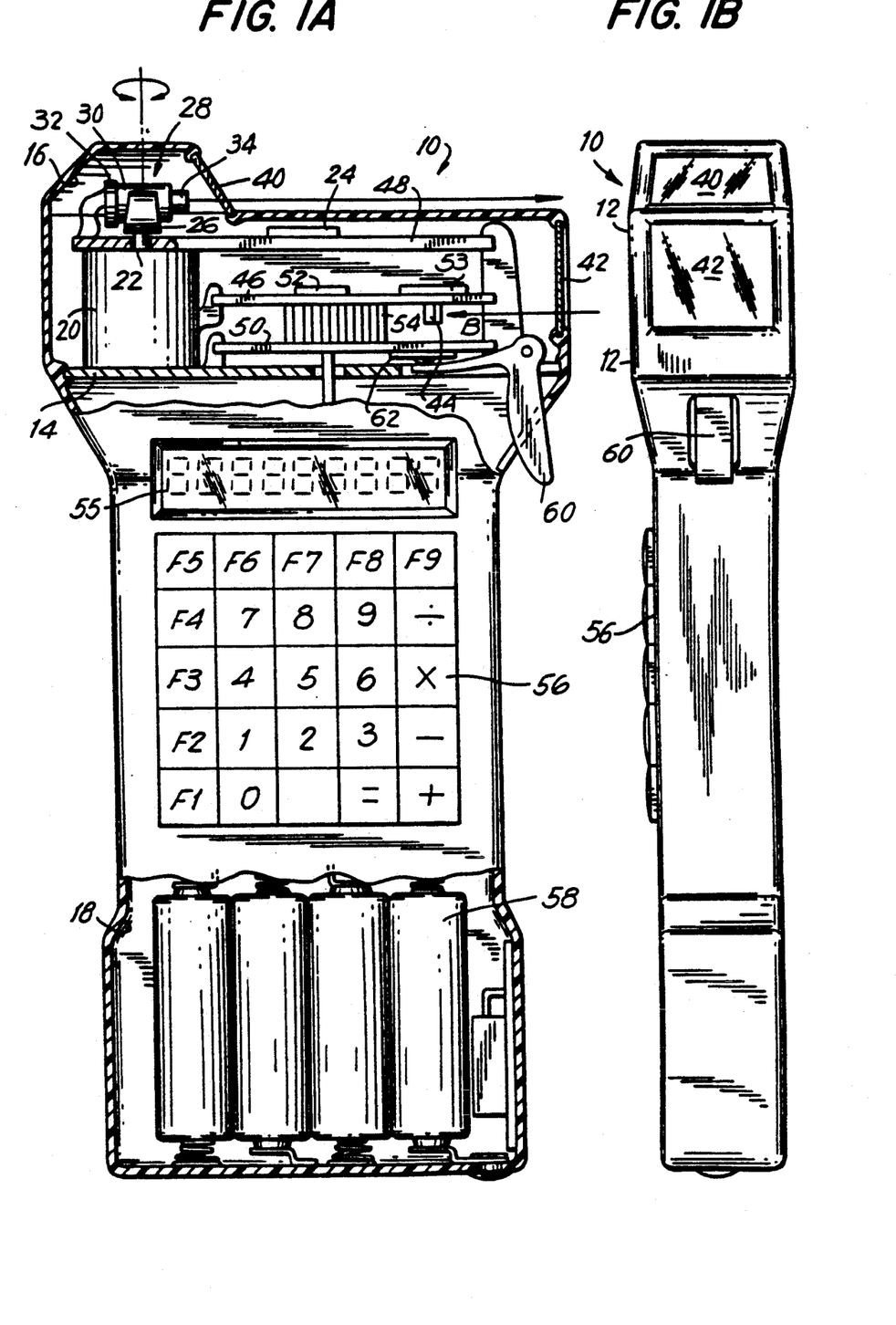
FIG. 1A is a partly broken-away, partly sectioned side view of a hand-held light scanning system in which a mirrorless scanner arrangement in accordance with this invention is housed.
FIG. 1B is an end view of FIG. 1A.

Referring now to the drawings, reference numeral 10 in FIGS. 1A and 1B generally identifies an arrangement in a scanner system of the type generally described in the above identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters and, in short, any indicia having portions of different light reflectivity.

The arrangement 10 comprises a hand-held housing 12 having a base 14 which subdivides the interior of the housing into an upper half 16 and a lower half 18. A lightweight, high-speed, miniature scanning motor 20 similar to that described in U.S. Pat. No. 4,496,831 is mounted on base 14. The motor 20 has an output shaft 22 which is repetitively driven in alternate circumferential directions about an axis along which the shaft extends over arc lengths less than 360° in each direction. Structural, functional and operational aspects of the motor 20 and of control circuitry 24 for the motor are set forth in detail in U.S. Pat. No. 4,496,831 and, hence, for the sake of brevity, will not be repeated herein.

One difference between the motor 20 of this invention and the motor of U.S. Pat. No. 4,496,831 is the superstructure that is mounted on the output shaft 22. Instead of a planar mirror as taught by said patent, the invention proposes, in FIG. 1A, mounting a generally U-shaped support 26 at the end of the shaft 22, and mounting a laser/optics subassembly 28 on the support 26. The subassembly 28 and the support 26 are jointly oscillated and turned with the shaft 22.

Figure 3:
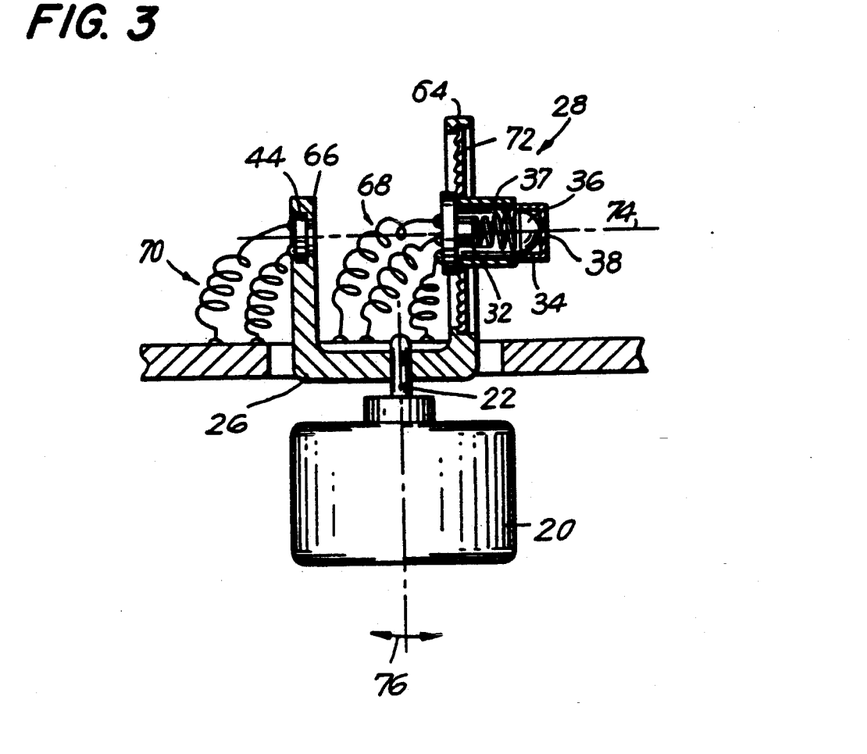
FIG. 3 is a partly sectioned side view of a mirrorless scanner arrangement in accordance with another embodiment of this invention.

The subassembly 28 includes an elongated hollow tube 30, a laser diode 32 fixedly mounted at one axial end region of the tube 30, a lens barrel 34 mounted at the opposite axial end region of the tube 30, and a focusing lens 36 mounted within the barrel (see FIG. 3). The focusing lens 36 is preferably a plano-convex lens, but may be spherical, convex or cylindrical as well. The barrel 34 has an end wall formed with an aperture stop 38 which is an which is an opening extending through the end wall. The barrel 34 is mounted for longitudinal telescoping movement within and along the tube 30. The lens 36 is situated adjacent the end wall of the barrel and is mounted for joint movement with the barrel. The position of the barrel and, in turn, of the lens relative to the diode is fixed typically by gluing or clamping, at the assembly site so that a known distance between the lens and the aperture stop, on the one hand, and between the lens, the aperture stop and the diode, on the other hand, is obtained. A coil spring 37 (see FIG. 3) is located within and extends along the barrel and tube, and has one coil end bearing against the diode, and another coil end bearing against a planar side of the lens. The spring urges the lens against the end wall having the aperture stop, thereby fixedly locating the lens relative to the aperture stop.

The subassembly 28, per se, forms no part of this invention and, in fact, is described and claimed in pending U.S. Pat. No. 4,816,660 to which reference can be had for further structural, functional and operational aspects of the subassembly. It is sufficient for this invention to understand that the subassembly 28 includes a solid-state laser diode 32 operative for propagating and generating an incident laser beam, either in the invisible or visible light range, and the combination of a focusing lens and an aperture stop together operative for focusing the laser beam to have a beam cross-section or beam spot of a certain waist size within a range of working distances relative to the housing 12. The focused beam passes through the aperture stop 38 and through a scan window 40 on the housing in the vicinity of a reference plane located exteriorly of the housing within the range of working distances along an outgoing optical path.

During the alternate, repetitive oscillations of the shaft 22, the support 26 and the subassembly 28 likewise participate in this oscillatory movement, thereby causing the beam spot to be swept in an arc whose center of curvature is located at the diode across the symbol at the reference plane and to trace a curved scan line thereat. Hence, no longer is a mirror used to effect sweeping of a beam spot across a symbol, but, instead, other scanner components are moved and, in the embodiment of FIG. 1A, these other components comprise the laser diode 32 and the optical components which are jointly turned as a unitary structure about an axis parallel to the reference plane.

A portion of the light reflected off the symbol passes along a return path through a second window 42 on the housing in the direction of arrow B to a photodetector 44 for detecting the variable intensity of the returning portion of the reflected laser light over a field of view, and for generating an electrical analog signal indicative of the detected variable light intensity. In the FIG. 1A embodiment, the photodetector 44 is stationarily mounted on the printed circuit board 46. Printed circuit boards 48 and 50 at either side of board 46 contain signal processing circuitry 52 and microprocessor control circuitry 53 for converting the analog electrical signal to a digital signal, and for processing the digital signal to data descriptive of the symbol being read. Details of the signal processing and microprocessor control circuitry can be had by reference to the above-identified patents and applications.

A two-part multi-wire plug-in cable connector 54 has one part electrically connected to the signal processing and microprocessor control circuitry and another part electrically connected to a flexible multi-wire cable 54' connected to a display 55 and a keyboard 56. A rechargeable battery pack 58 supplies power to the laser diode and the electrical circuitry in the housing. By moving only the laser diode and the optical component relative to the stationary photodetector, power from the battery pack is conserved.

Means for initiating reading may advantageously include a trigger 60 mounted on the housing 12. The trigger extends in part outwardly of the housing to be manually actuated by a user who is holding the housing 12 in his hand. The trigger is operatively connected through trigger switch 62 and actuates the laser diode 32, the motor 20, the photodetector 44, the signal processing circuitry 52 and the control circuitry 53 to initiate a reading of the symbol. The trigger is actuated once for each symbol to be read, each symbol in its respective turn. Once the control circuitry determines that the symbol has been successfully decoded, the control circuitry terminates the reading of the symbol and deactuates the previously actuated components in the housing and readies the system for the next symbol.

Figure 2:
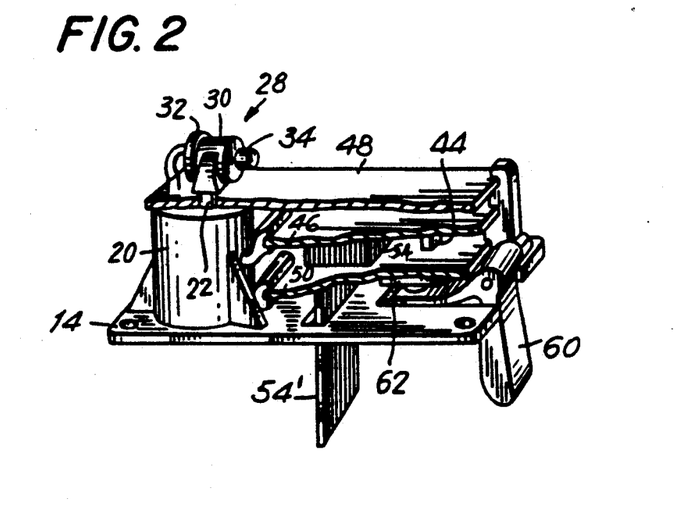
FIG. 2 is a front perspective view of the mirrorless scanner arrangement of FIG. 1A.

FIG. 2 illustrates the various electrical, mechanical and optical components assembled as a modular unit prior to mounting in the upper half 16 of the housing 12 of FIGS. 1A, 1B. The electrical circuitry on the printed circuit boards 46, 48, 50, a well as on base 14, has been omitted from FIG. 2 for the sake of clarity.

Turning now to FIG. 3, like parts with that of FIG. 1A have been identified with like reference numerals. The oscillating motor 20, once again, has an output shaft 22 on which a generally U-shaped support 26 is mounted. A laser/optics subassembly 28 is mounted on one leg 64 of the support. A photodetector 44 is mounted on another leg 66 of the support. Coiled tensile wire groups 68, 70 connect the diode 32 and the photodetector 44 to the non-illustrated electrical circuitry on printed circuit board 48. Although coiled wires have been illustrated, other types of electrical connectors, e.g. flat cable, could be employed. A collecting lens 72 is mounted on leg 64 and coaxially surrounds subassembly 28. The lens 72, the subassembly 28 and the photodetector 44 all have a common boresight or optical axis 74 along which the optical and return paths are co-linear, and are all oscillatable as a unit in alternate circumferential directions (see double-headed arrow 76 in FIG. 4) about the axis along which shaft 22 extends.

Figure 4:
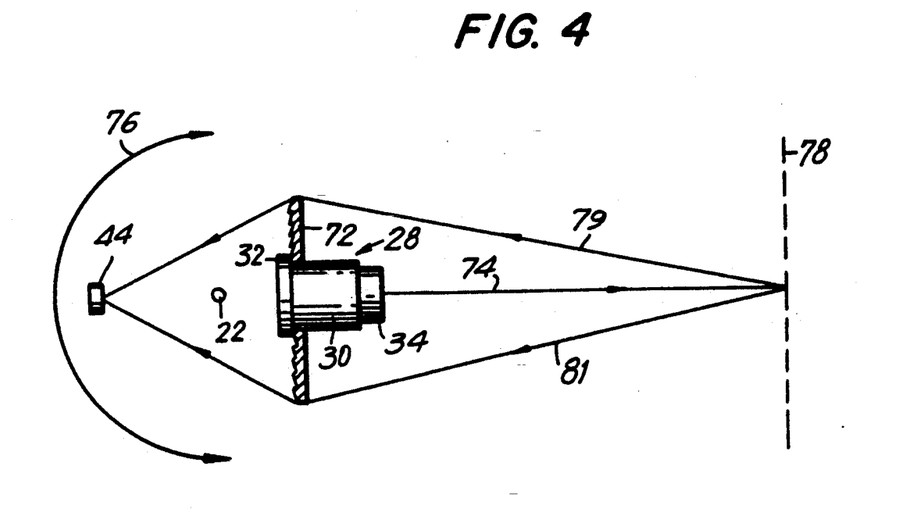
FIG. 4 is a diagrammatic top plan view of the embodiment of FIG. 3 depicting its operation.

The operation of the FIG. 3 embodiment is schematically shown in FIG. 4. An incident laser beam is emitted from the subassembly 28. In a center position, this beam is directed along optical axis 74 to a reference plane 78 at which a symbol is located. Light is scattered in all directions from the symbol. A portion of the reflected light, as represented by light rays 79, 81, is incident on collecting lens 72, e.g. a Fresnel lens, and focused onto an inlet of the photodetector 44. The inlet may be round, square or rectangular (see FIG. 6). As the unit turns in the direction of either arrow 76, the beam spot at the reference plane likewise moves across the symbol. The returning light is always focused onto the inlet of the photodetector.

The FIG. 3 embodiment is retro-reflective because not only the incident beam, but also the field of view of the photodetector, are being simultaneously scanned across the symbol. By contrast, the FIGS. 1A, 1B embodiment is a so-called "flying spot" scanner, because only the incident beam is being swept across the symbol, the photodetector being stationary.

Figures 5, 6:
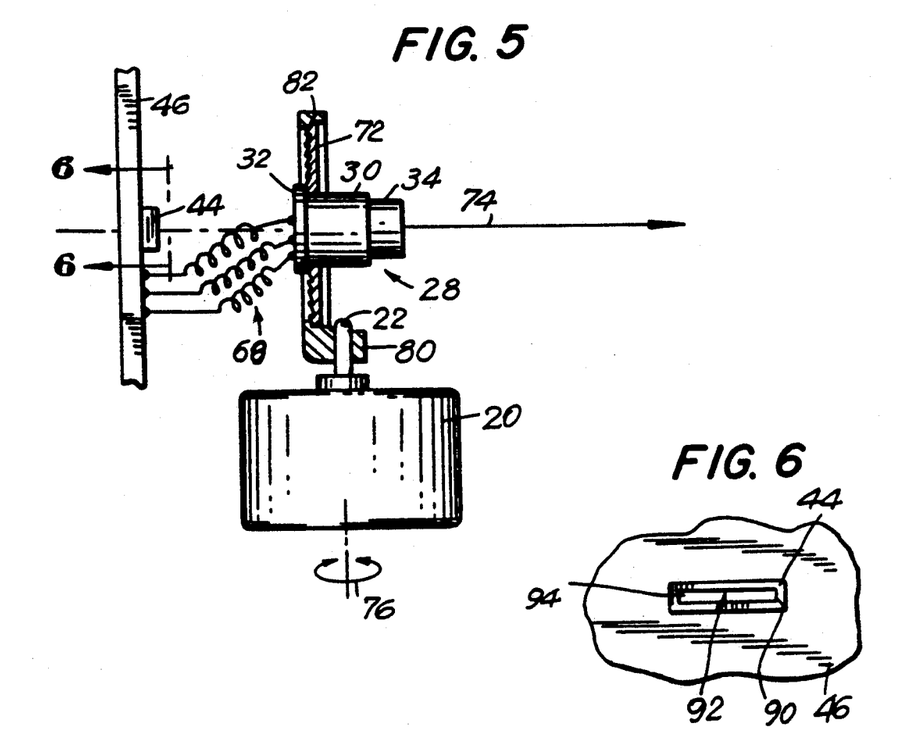
FIG. 5 is a partly sectioned side view of a mirrorless scanner arrangement in accordance with yet another embodiment of this invention.
FIG. 6 is an enlarged view taken on line 6—6 of FIG. 5.
Figure 7:
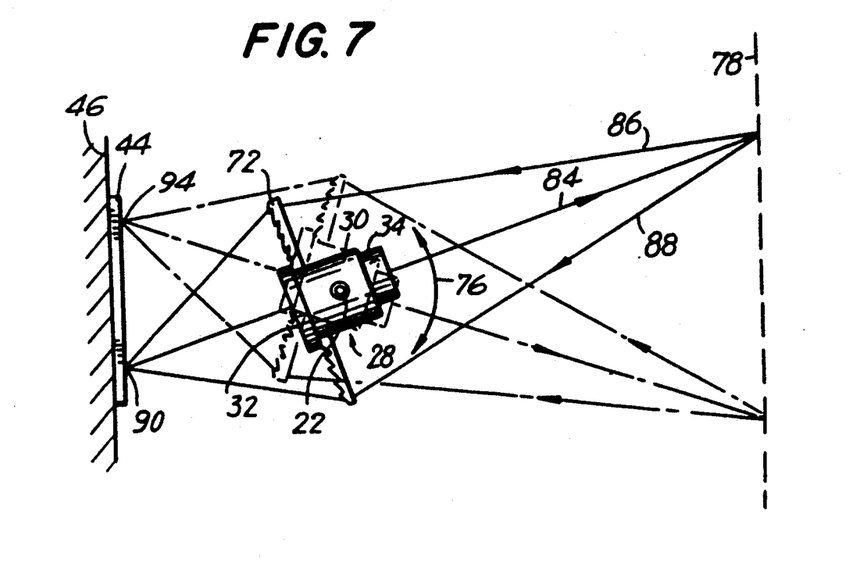
FIG. 7 is a diagrammatic top plan view of the embodiment of FIG. 5 depicting its operation at two end-limiting positions.

Turning now to the embodiment of FIGS. 5-7, like reference numerals again identify like parts. The oscillating motor 20, once again, has an output shaft 22 on which a support 80 is mounted. Rather than being U-shaped like support 26, support 80 is L-shaped and has an upright leg 82. A laser/optics subassembly 28 is mounted on leg 82. A photodetector 44 is stationarily mounted on printed circuit board 46. Coiled tensile wire group 68 interconnects the diode 32 and electrical circuitry on board 46. Collecting lens 72 is mounted on leg 82 in a coaxially surrounding relationship with subassembly 28. The lens 72 and the subassembly 28 turn as a unit in either direction of double-headed arrow 76, whereas photodetector 44, in contrast to the previous embodiment of FIG. 3, is stationary.

As schematically shown in FIG. 7, an incident light beam emitted from subassembly 28 is directed in one end-limiting position along optical axis 84 to impinge on a symbol located at the reference plane 78, whereupon a portion of the reflected light, as represented by light rays 86, 88, is incident on collecting lens 72 and focused at one end 90 of an elongated slot-like inlet 92 of the photodetector 44, best shown in FIG. 6. At an opposite end-limiting position, shown in phantom lines in FIG. 7, the collected portion of reflected light is focused at an opposite end 94 of the inlet 92. Between end-limiting portions, the collected, focused light travels lengthwise along the inlet 92.

The FIGS. 5-7 embodiment is another retroreflective arrangement, because both the incident beam is being swept across the symbol, and the field of view of the photodetector is likewise being swept across the symbol at the same time due to the movement of the collecting lens. The collecting lens could be eliminated by having the output power of the light source sufficiently high.

Figure 8:
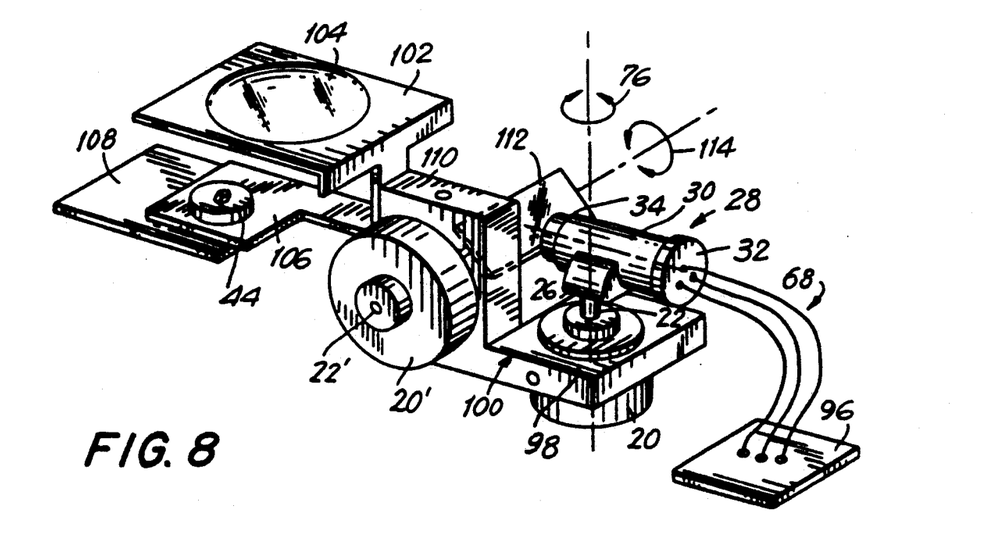
FIG. 8 is a rear perspective view of the mirrorless scanner arrangement of FIG. 2 as employed in a multi-axis scanning system.

As described so far, the various embodiments describe a single curved trace or scan line in one direction across the symbol being read. FIG. 8 shows an arrangement for generating a scan pattern extending in more than one direction over the symbol. Thus, as before, motor 20 repetitively drives output shaft 22, support 26 and laser/optics subassembly 28 in the alternate directions indicated by arrows 76. Tensile wire group 68 interconnects the diode 32 with a low voltage power supply 96. The motor and its superstructure are mounted on a horizontal platform 98 of a base 100.

The base has additional platforms for other components. Thus, horizontal platform 102 supports a collecting lens 104. Platform 106 supports a photodetector 44 on an upper surface, as well as a printed circuit board 108 on which signal processing circuitry is mounted on a lower surface.

A second motor 20' identical to motor 20 is mounted on a vertical platform 110 and has an output shaft 22' which is at right angles to shaft 22. Instead of the aforementioned superstructure, a planar mirror 112 is mounted at one end of shaft 22', thereby being similar to the scanning element described in U.S. Pat. No. 4,496,831. The motor 22' drives the mirror 112 in alternate circumferential directions as indicated by double-headed arrow 114.

In operation, with motors 22, 22' both oscillating the components mounted on their shafts, a scan pattern composed of multiple lines is generated over the symbol. Thus, with motor 20 generating a single scan line along an X-axis direction, motor 20' will move the single scan line along a Y-axis, thereby generating a set of mutually parallel lines extending across the pattern. By varying the speed, direction and frequency of the motors 20, 20', complex scan patterns, e.g. Lissajous patterns, can be generated.

Due to the oscillatory movement of the laser/optics subassembly 28, the tensile wires 68 interconnecting the diode and its power supply 96 are subjected to considerable stress. The mechanical integrity of the wire joints is weakened by such stress forces generated while the subassembly changes directions. Generally speaking, these stress forces are proportional to the distance between the shaft 22 and the point of the wire attachment to the subassembly.

Figure 9:
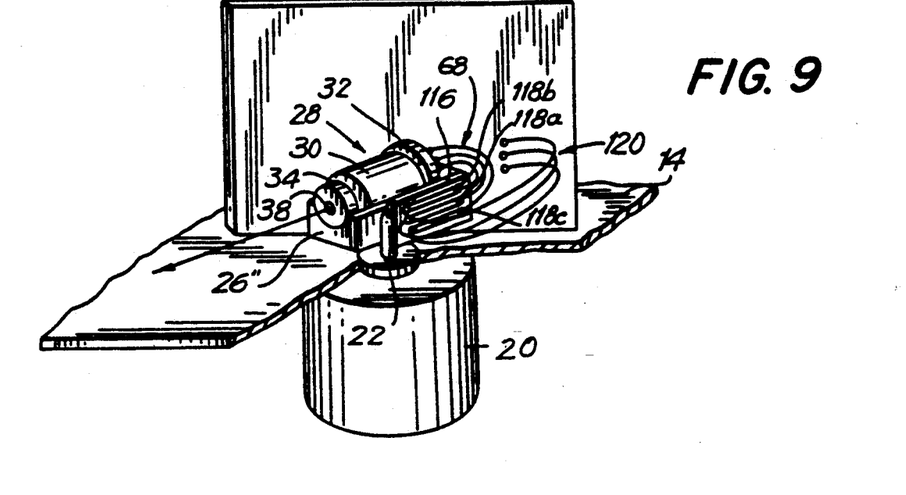
FIG. 9 is a partly broken-away perspective view of an additional embodiment of the mirrorless scanner arrangement in accordance with this invention.

FIG. 9 shows an arrangement wherein the wire joints between the diode and its power supply are positioned in the immediate vicinity of the shaft, thereby minimizing the stress forces acting to weaken such joints and maximizing the working lifetime of the arrangement.

Thus, a support block 26" is mounted on the shaft 22, but off to one side of the shaft. The subassembly 28 is mounted on the block 26". A printed circuit board 116 is mounted at the side of the block facing the shaft 22. The board 116 has three printed conductive strips 118a, 118b, 118c extending along the board 116. The laser diode 32 has a first group of wires 68 connected to respective ends of the strips; and a second group of wires 120 is connected to respective opposite ends of the strips and to the power supply 96. The subassembly 28, the board 116 and the first group of wires 68 are jointly oscillated. The second group of wires 120 is subjected to stress forces, but, as shown, the wire joints at the opposite ends of the strips are immediately adjacent the shaft 22 so that the magnitude of the stress forces is much reduced as compared to the situation wherein the first group of wires 68 were directly connected to the power supply 96.

Figure 10:
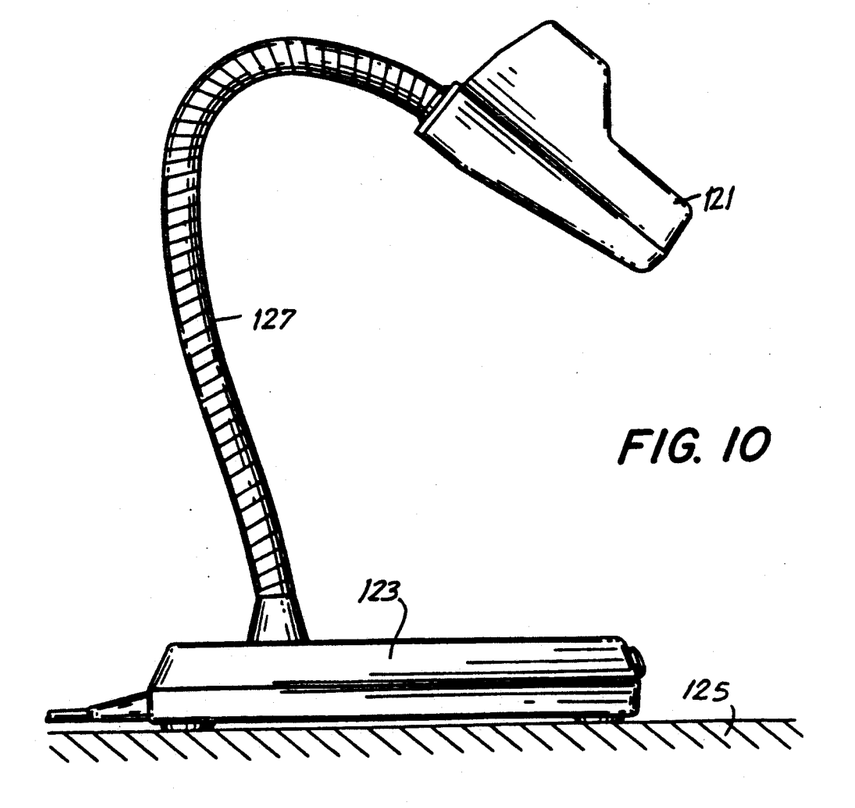
FIG. 10 is a side view of a gooseneck-type scanning system workstation for use with any of the mirrorless scanner arrangements of this invention.

FIG. 10 shows a desk-top workstation wherein a housing 121 generally having the same shape as the upper half of housing 12 in FIG. 1A is mounted above a base 123 situated on a generally horizontal support surface such as a tabletop 125. A gooseneck-type semi-rigid, bendable, conduit 127 interconnects the housing 121 with the base 123 and enables the housing to be manually bendably positioned in any desired orientation relative to the base and to be maintained in the desired orientation. The light beam emitted from the housing can thus be positioned at any desired angle relative to the symbol to be read.

Advantageously, the base 123 is hollow and contains signal processing circuitry which is connected by electrical wires running through the conduit 127 to the mirror scanning arrangement contained in the housing 121. Instead of the base, the end of the conduit remote from the housing 121 could be attached to a cash register, analogous point-of-sale apparatus, or a fixed mount, e.g. on a production line.

As described so far, the laser diode/optics subassembly 28 by itself or with the photodetector 44 is turned about an axis to effect a scanning or sweeping action. This invention also proposes moving the focusing lens 36 either by itself or with the aperture stop 28 relative to the diode 32 in a plane generally parallel to the light-emitting outlet of the diode.

Figure 11:
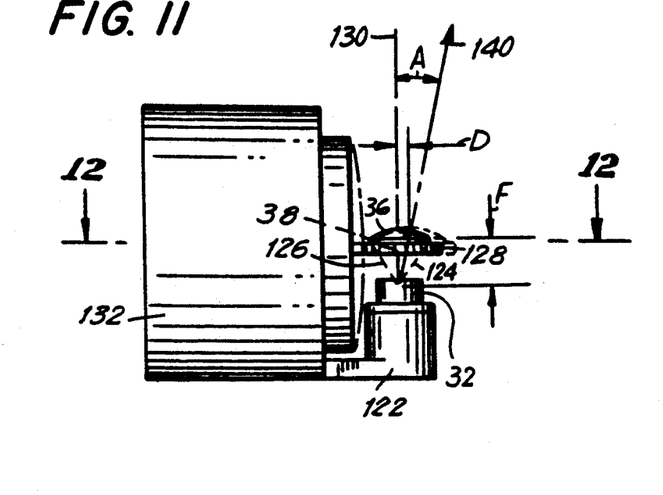
FIG. 11 is a side view of still another embodiment of a mirrorless scanner arrangement in accordance with this invention.

Turning to FIG. 11, the laser diode 32 is stationarily mounted on a support 122. The diode 32 emits along optical axis 130 a wide-angle fan-shaped laser beam schematically represented by light rays 124, 126. The fan-shaped beam diverges at different angles in both orthogonal planes extending parallel to the plane of the diode outlet and perpendicular to the optical axis 130. The focusing lens 36 is mounted in a holder 128 at a fixed distance of focal length F as measured along axis 130, from the diode. The holder has an opening centered on the axis 130, the opening serving as the aperture stop 38.

Figure 12:
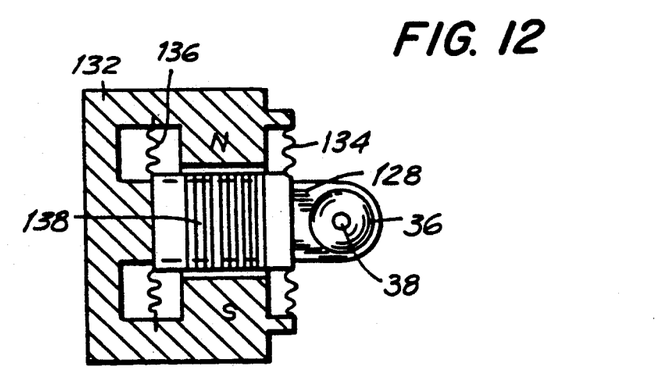
FIG. 12 is a sectional view taken along line 12—12 of FIG. 11.

The holder 128, as shown in FIG. 12, extends into a permanent magnet casing 132. A pair of convoluted diaphragm suspension springs 134, 136 support the holder 128 on the magnet casing 132. A voice coil 138 surrounds the holder 128 inside the casing 132 and is bounded by north N and south S poles of the casing.

By electrically energizing the coil 138, the holder and, in turn, the lens and the aperture stop are made to jointly reciprocate back and forth in a plane perpendicular to axis 130 due to electromagnetic attraction and repulsion forces generated at the coil. If the deflection of the lens and aperture stop as measured from the axis 130 to one end-limiting position is denoted D, then it can be shown that the deflected laser beam represented by light ray 140 is shifted by an angular distance $A = -\tan^{-1}(D/F)$.

Figure 13:
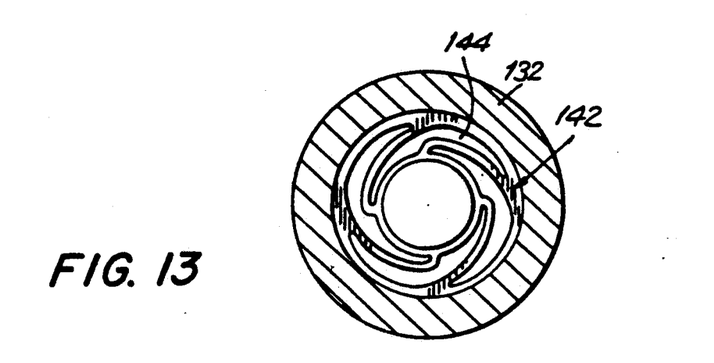
FIG. 13 is a cross-sectional view of an alternate spring for use in the embodiment of FIGS. 11 and 12.

FIG. 13 shows an alternate to the convoluted springs 134, 136. A so-called "spider" spring 142 having curved legs 144 could also be used.

Figure 14:
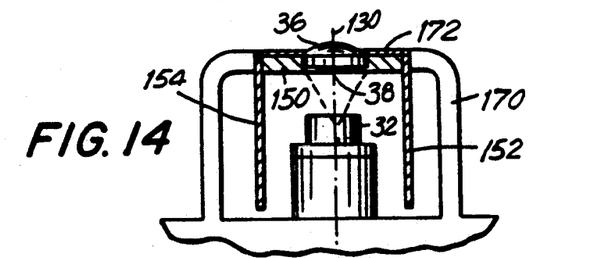
FIG. 14 is a sectional view taken on line 14—14 of FIG. 16.
Figure 15:
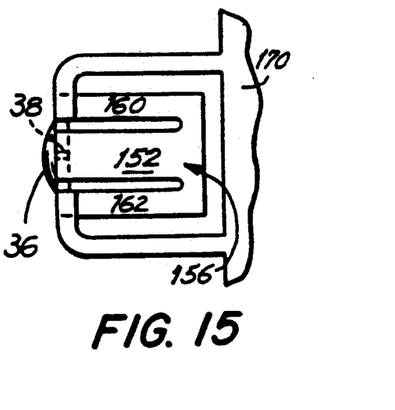
FIG. 15 is an end view of the embodiment of FIG. 16.
Figure 16:
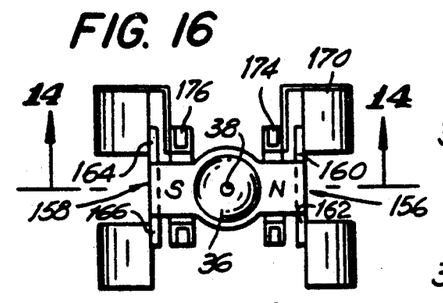
FIG. 16 is a top plan view of an additional embodiment of a mirrorless scanner arrangement in accordance with this invention.

FIG. 14 shows another arrangement for reciprocally shifting the lens 36 and aperture stop 38 in a plane parallel to the plane of the outlet of the diode 32. The lens 36 is mounted on a bridge support 150 which spans the distance between, and is carried by, two center legs 152, 154 of E-shaped leaf springs 156, 158. Outer legs 160, 162 of spring 156 and outer legs 164, 166 of spring 158 are stationarily connected to an overhead support frame 170.

The bridge support 150 has an opening centered on optical axis 130, the opening serving as the aperture stop 38. A permanent magnet strip 172 having a north N pole at one end and a south S pole at an opposite end is carried by the bridge support. A pair of driving coils 174 176 surrounds each pole.

In operation, each driving coil is electrically energized. Electromagnetic attraction and repulsion forces are generated by magnetic interaction between the coils and the poles N, S, thereby causing the bridge support to be reciprocally shifted in a plane perpendicular to axis 130. FIG. 14 shows this arrangement in a center, non-shifted position. By contrast, the FIG. 17 embodiment described below illustrates a shifted position. It will be noted that only the upper ends of the center legs of the E-springs are displaced. A substantially constant distance between the lens and aperture stop combination and the diode is maintained. Proper laser beam focus at the reference plane is thus maintained thereat.

As before, the shifting of the lens and aperture stop causes the laser beam emitted by the diode to be deflected at an angle $A = \tan^{-1}(D/F)$. The beam spot is moved along an arc around a center of curvature at the lens. It is possible, by having unequal lengths or stiffnesses in the legs of the springs, to have the beam spot moved in a desired manner across the symbol. For example, the spot can be moved in a straight line.

Figure 17:
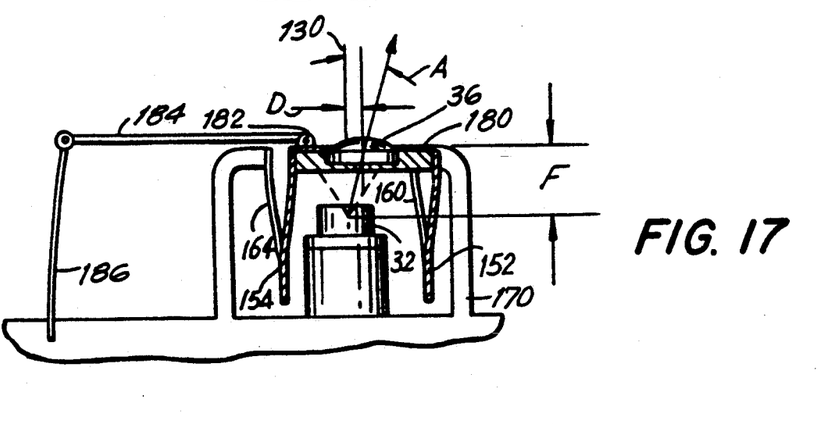
FIG. 17 is a view analogous to FIG. 14, but of another embodiment of a mirrorless scanner arrangement in accordance with this invention.

Rather than using electromagnetic means, other means can be used to displace the lens and aperture stop. FIG. 17 shows an arrangement identical to FIG. 14, but, instead of the magnetic strip 172, a plate 180 is connected to the bridge support. The plate 180 has a lug 182 to which a drive bar 184 is pivotably connected. The bar 184 can be connected to a pure mechanical drive, an electro-mechanical drive, or a piezo-electric substrate, i.e. a transducer operative for converting electrical to mechanical energy, to effect the reciprocal movement.

In another variant, the center legs 152, 154 of the springs can be made of one bi-metallic material while the outer legs are made of another bi-metallic material. Heating all the legs would cause the center legs to be displaced relative to the outer legs.

In FIGS. 14–17, since the aperture stop 38 moves with the lens 36, the output power of the laser beam will decrease at the ends of the scan line, because the intensity of the unfocused laser beam is brightest on the axis 130. This loss of power at the ends of the scan line could be compensated electrically by sensing the output power of the beam, or the light reflected off the rear surface of the aperture stop, and by adjusting the electrical supply current to the laser diode so as to maintain a constant power output.

Figure 18:
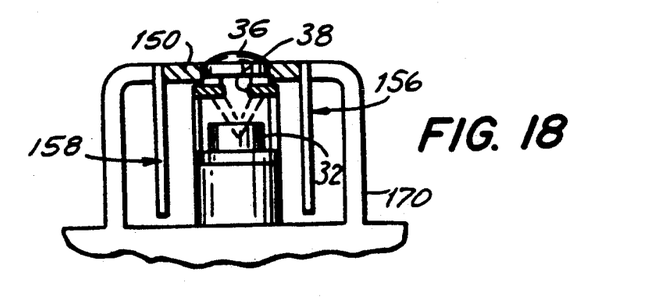
FIG. 18 is a view analogous to FIG. 14, but of still another embodiment of a mirrorless scanner arrangement in accordance with this invention.

Another approach is shown in FIG. 18, wherein the aperture stop 38 is held stationary, and only the focusing lens 36 is reciprocally shifted. Since the laser beam does not pass through the center of the lens 36 when the lens is shifted off axis, the deflection or scan angle A is amplified. Light passing through the lens off the axis 130 has more optical aberrations, but they have not been found to be significant for bar code reading applications.

The low mass of the moving structure, i.e. the lens alone; the lens and aperture stop together; the lens, aperture stop and diode jointly; and the lens, aperture stop, diode and photodetector jointly, enables the system to operate at resonance for low power applications, as well as off resonance. Very high scanning speeds on the order of 40 scans per second and more are obtainable due to the low mass of the moving structure.

Figures 19, 20, 21:
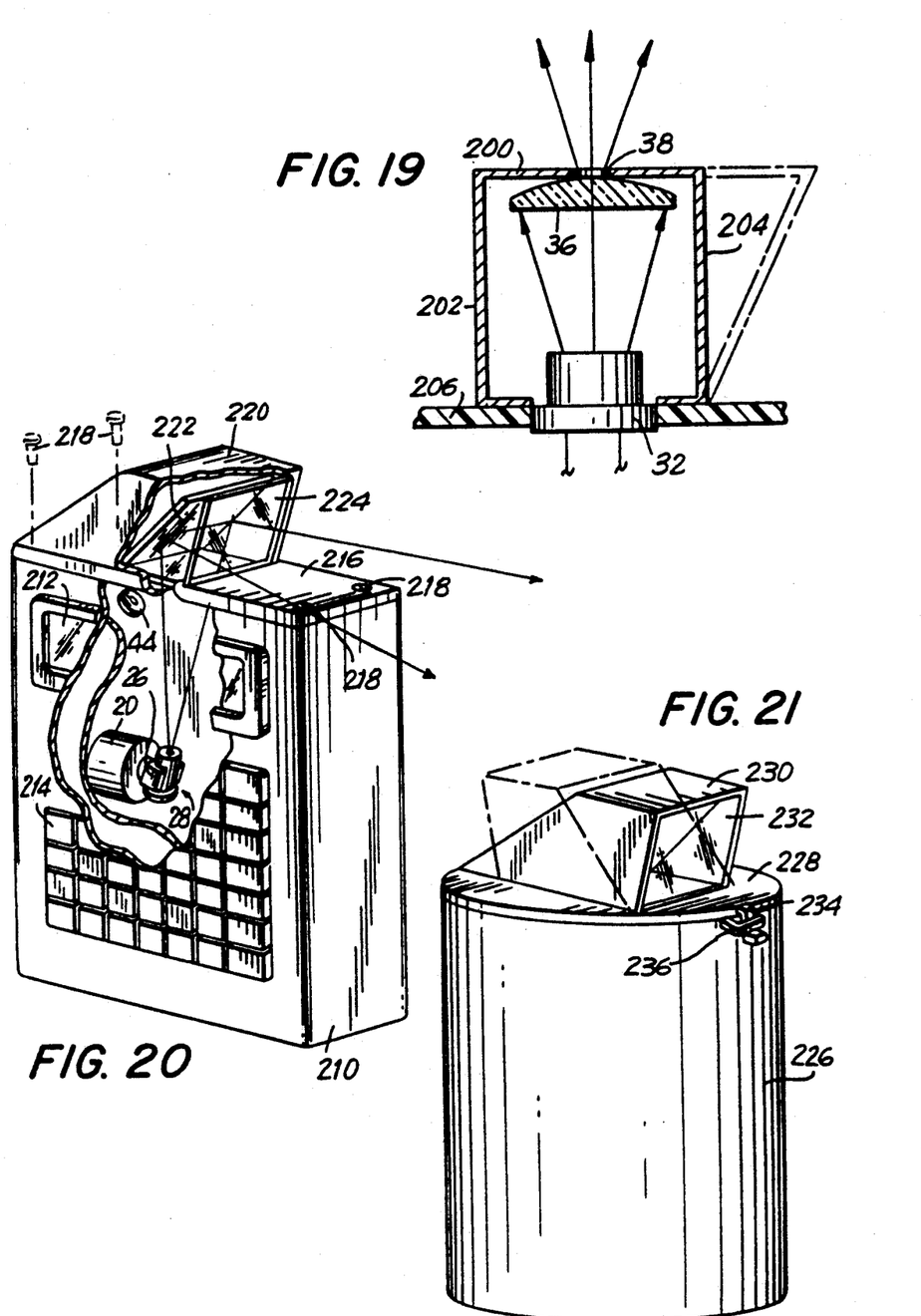
FIG. 19 is a view analogous to FIG. 14, but of yet another embodiment of a mirrorless scanner arrangement.
FIG. 20 is a partly broken-away, perspective view of a hand-held scanning system for use with the mirrorless scanning arrangement.
FIG. 21 is a perspective view of a hand-held, swivel-type scanning system for use with the mirrorless scanning arrangement.

Yet another approach is shown in FIG. 19, wherein the focusing lens 36 is held stationary, and only the aperture stop 38 is reciprocally shifted. The aperture stop 38 is formed as an opening in a top wall 200 that is positioned by side walls 202, 204 at a distance from a support 206 on which the laser diode 32 is mounted. The apertured top wall 200 is shiftable to the left and to the right, as indicated by the phantom lines, by any reciprocating drive, e.g. an electromagnet or piezoelectric drive. Bimorph material can also be used for the walls 200, 202, 204 to move the aperture stop in a plane in front of the lens 36.

FIG. 20 shows the compact laser/optics subassembly 28 mounted on the reciprocating motor 20, as described above, installed in a hand-held housing 210 equipped with a display 212 and a keyboard 214. The housing 210 has a rectangular cross-section and, at its top, is provided with a superstructure that enables scanning to be performed to the right or, in another mode of operation, to the left of the housing.

The housing 210 has a top rectangular wall 216 fixedly mounted in place with the aid of four screws 218 at the corners of the top wall. A hood 220 is mounted at one end of the top wall. A stationary reflecting mirror 222 is located within the confines of the hood above the top wall 216. A scan window 224 closes the interior of the hood from the environment. The mirror 222 is positioned in the path of the emitted laser beam emanating from the laser/optics subassembly 28, and redirects the laser beam toward one side, e.g. toward the right side, of the housing. Returning light from the symbol being read passes through the window 224 and is collected by photodetector 44.

By removing the four screws 218, turning the superstructure by 180°, replacing the screws 218, the scanning arrangement will work just as described above, except that, this time, the mirror 222 will redirect the laser beam toward the other side, e.g. toward the left side, of the housing. In this way, right- and left-handed users can be accommodated.

To the same effect is the structure shown in FIG. 21 in which the emitted beam can also be directed toward the right or the left. A housing 226 of cylindrical cross-section has a circular top wall 228 on which a hood 230 is supported. A reflecting mirror identical to mirror 222 is mounted within hood 230. A scan window 232 closes the hood 230. An L-shaped locking lug 234 depends from the top wall 228 and, in the illustrated position, lockingly engages a hook 236 provided on the circular side wall of the housing 226. The same laser/optics subassembly shown in FIG. 20 is mounted within housing 226. The laser beam is propagated toward the right in FIG. 21.

To accommodate the user, the top wall 228 and hood 230 can be turned to the position shown in phamtom lines until the lug 234 engages another non-illustrated hook spaced 180° away from hook 236. In this locked position, the laser beam is propagated toward the left in FIG. 21. The swiveling of a locking lug to engage one or the other of two hooks with a snap-type action is somewhat easier to perform than the removal and replacement of screws as described for FIG. 20.

In all of the various embodiments, the mirrorless scanning arrangement is very compact in size. This allows the arrangement to be fabricated as a module that can be installed in many different types of laser scanning systems. The module advantageously comprises a laser/optics subassembly mounted on a support such as a reciprocating scan component, together with a photodetector, all of which are connected to an electrical connector to enable the module to be electrically connected to other electrical components.

It will be understood that each of the elements described above, or two or more together, also may find a useful application in other types of constructions differing from the types described above.

While the invention has been illustrated and described as embodied in mirrorless scanners with movable laser, optical and sensor components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A scanner arrangement in a light scanning system for reading indicia having parts of different light reflectivity, said system being of the type including:
   (A) a light source component for emitting a light beam,
   (B) an optical component for optically modifying and directing the light beam from the light source component along a non-folded optical path toward indicia located in the vicinity of a reference plane exteriorly of the system, and
   (C) a photodetector component having a field of view and operative for detecting at least a portion of light of variable intensity reflected off the indicia along a return path, and for generating an electrical signal indicative of the detected light intensity,
   said arrangement comprising:
   scanning means for mounting all of said components on a common boresight along which the optical and return paths are co-linear for scanning movement, and for moving all of said components to scan at least one of said light beam and said field of view across the indicia.

2. The arrangement according to claim 1, wherein the scanning means includes a scanning motor for oscillating an output shaft, and a movable support mounted on the shaft for joint movement therewith; and wherein all of said components are mounted on the movable support.

3. The arrangement according to claim 2, wherein the movable support has two support legs spaced apart of each other, and wherein the light source component and the optical component are mounted on one of the legs, and wherein the photodetector component is mounted on the other of the legs.

4. The arrangement according to claim 3, wherein a Fresnel lens surrounds the light source component.

5. A scanner arrangement in a light scanning system for reading bar code symbols, said system being of the type including:
(A) a laser diode for emitting a laser beam,
(B) a focusing lens and an aperture stop for optically modifying and directing the laser beam from the laser diode along a non-folded optical path toward the symbol located in the vicinity of a reference plane exteriorly of the system, and
(C) a photodetector having a field of view and operative for detecting at least a portion of laser light of variable intensity reflected off the symbol, and for generating an electrical signal indicative of the detected laser light intensity,
said arrangement comprising:
scanning means for mounting the laser diode, the focusing lens and the aperture stop for scanning movement, and for moving the diode, lens and aperture stop together as a unit to scan at least one of said laser beam and said field of view across the symbol.

6. The arrangement according to claim 5, wherein the scanning means includes a scanning motor for oscillating an output shaft, and a movable support mounted on the shaft for joint movement therewith; and wherein the laser diode, the focusing lens, the aperture stop and the photodetector are mounted on the movable support.

7. The arrangement according to claim 6, wherein the support has two support legs spaced apart of each other, and wherein the laser diode, the focusing lens and the aperture stop are mounted on one of the legs, and wherein the photodetector is mounted on the other of the legs.

8. The arrangement according to claim 7, wherein a Fresnel lens surrounds the laser diode.

9. A scanner arrangement in a light scanning system for reading indicia having parts of different light reflectivity, said system being of the type including:
(A) a light source component for emitting a light beam,
(B) an optical component for optically modifying and directing the light beam from the light source component along a non-folded optical path toward indicia located in the vicinity of a reference plane exteriorly of the system, and
(C) a photodetector component having a field of view and operative for detecting at least a portion of light of variable intensity reflected off the indicia, and for generating an electrical signal indicative of the detected light intensity,
said arrangement comprising:
scanning means for mounting only two of the components for scanning movement relative to the other component, and for moving said only two components relative to said other component to scan at least one of said light beam and said field of view across the indicia.

10. The arrangement according to claim 9, wherein the scanning means includes a scanning motor for oscillating an output shaft, and a movable support mounted on the shaft for joint movement therewith, and wherein said only two components are mounted on the movable support.

11. The arrangement according to claim 10, wherein the light source component and the optical component are mounted on the support.

12. The arrangement according to claim 11, wherein a Fresnel lens surrounds the light source component.

13. The arrangement according to claim 10; and further comprising a stationary support on which the photodetector component is mounted.

14. A method of reading indicia having parts of different light reflectivity in a light scanning system of the type including:
(A) a light source component for emitting a light beam,
(B) an optical component for optically modifying and directing the light beam form the light source component along a non-folded optical path toward indicia located in the vicinity of a reference plane exteriorly of the system, and
(C) a photodetector component having a field of view and operative for detecting at least a portion of light of variable intensity reflected off the indicia along a return path, and for generating an electrical signal indicative of the detected light intensity,
said method comprising the steps of:
mounting all of said components on a common boresight along which the optical and return paths are co-linear for scanning movement, and moving all of said components to scan at least one of said light beam and said field of view across the indicia.

15. The method according to claim 14, wherein the moving step is performed by mounting all of said components on a movable support, by mounting the movable support on an oscillatable output shaft of a scanning motor, and by energizing the motor to oscillate the shaft.

16. A method of reading bar code symbols in a light scanning system of the type including:
(A) a laser diode for emitting a laser beam,
(B) a focusing lens and an aperture stop for optically modifying and directing the laser beam from the laser diode along a non-folded optical path toward the symbol located in the vicinity of a reference plane exteriorly of the system, and
(C) a photodetector having a field of view and operative for detecting at least a portion of laser light of variable intensity reflected off the symbol, and for generating an electrical signal indicative of the detected laser light intensity,
said method comprising the steps of:
mounting the laser diode, the focusing lens and the aperture stop for scanning movement, and moving the diode, lens and aperture stop together as a unit to scan at least one of said laser beam and said field of view across the symbol.

17. The method according to claim 16, wherein the moving step is performed by mounting the laser diode, the focusing lens and the aperture stop on a movable support, by mounting the movable support on an oscillatable output shaft of a scanning motor, and by energizing the motor to oscillate the shaft.

18. A method of reading indicia having parts of different light reflectivity in a light scanning system of the type including:
(A) a light source component for emitting a light beam,
(B) an optical component for optically modifying and directing the light beam from the light source component along a non-folded optical path toward indicia located in the vicinity of a reference plane exteriorly of the system, and
(C) a photodetector component having a field of view and operative for detecting at least a portion of light of variable intensity reflected off the indicia, and for generating an electrical signal indicative of the detected light intensity,
said method comprising the steps of:
mounting only two of the components for scanning movement relative to the other component, and moving said only two components relative to said other component to scan at least one of said light beam and said field of view across the indicia.

19. In an electro-optical system for reading coded symbols, said system being of the type including:
(A) a light source for emitting a light beam,
(B) optical means for focusing and directing the light beam from the light source along a non-folded optical path toward a symbol, and
(C) a photodetector having a field of view and operative for sensing at least a portion of light of variable intensity reflected off the symbol along a return path,
a scanner arrangement comprising:
means for mounting the light source, the optical means and the photodetector on a common boresight along which the optical and return paths are co-linear for scanning movement, and for simultaneously moving the light source, the optical means and the photodetector all together to scan at least one of said light beam and said field of view across the symbol.

20. In an electro-optical scanner for reading bar code symbols, said scanner being of the type including:
(A) a laser diode for emitting a laser beam,
(B) a focusing lens an aperture stop for focusing and directing the laser beam from the laser diode along a non-folded optical path toward the symbol, and
(C) a photodetector having a field of view and operative for detecting at least a portion of laser light of variable intensity reflected off the symbol,
a scanner arrangement comprising:
means for mounting the laser diode, the focusing lens and the aperture stop on a common support, and for moving the diode, the lens and the aperture stop together on the support as a unit to scan at least one of said laser beam and said field of view across the symbol.

21. In an electro-optical system for reading symbols, said system being of the type including:
(A) a light source for emitting a light beam,
(B) an optical component for focusing and directing the light beam from the light source along a non-folded optical path toward a symbol, and
(C) a photodetector having a field of view and operative for detecting at least a portion of light of variable intensity reflected off the symbol,
a scanner arrangement comprising:
means for mounting the light source and the optical component for scanning movement relative to the photodetector, and for moving said light source and said optical component relative to said photodetector to scan at least one of said light beam and said field of view across the symbol.

22. A method of reading symbols in an electro-optical system of the type including:
(A) a light source for emitting a light beam,
(B) an optical component for focusing and directing the light beam from the light course along a non-folded optical path toward a symbol, and
(C) a photodetector having a field of view and operative for detecting at least a portion of light of variable intensity reflected off the symbol along a return path,
said method comprising the steps of:
mounting the light source, optical component and the photodetector on a common boresight along which the optical and return paths are co-linear for scanning movement, and simultaneously moving the light source, optical component and photodetector to scan at least one of said light beam and said field of view across the symbol.

23. A method of reading bar code symbols in an electro-optical scanner of the type including:
(A) a laser diode for emitting a laser beam,
(B) a focusing lens and an aperture stop for focusing and directing the laser beam from the laser diode along a non-folded optical path toward the symbol, and
(C) a photodetector having a field of view and operative for detecting at least a portion of laser light of variable intensity reflected off the symbol,
said method comprising the steps of:
mounting the laser diode, the focusing lens and the aperture stop on a common support, and moving the diode, lens and aperture stop together on the support as a unit to scan at least one of said laser beam and said field of view across the symbol.

24. A method of reading symbols in an electro-optical scanner of the type including:
(A) a light source for emitting a light beam,
(B) an optical component for focusing and directing the light beam from the light source component along a non-folded optical path toward a symbol, and
(C) a photodetector having a field of view and operative for detecting at least a portion of light of variable intensity reflected off the symbol,
said method comprising the steps of:
mounting only the light source and the optical component for scanning movement relative to the photodetector, and moving said light source and the optical component relative to the photodetector to scan at least one of said light beam and said field of view across the symbol.

25. A mirrorless scanner arrangement in a light scanning system for reading indicia having parts of different light reflectivity, said system being of the type including:
(A) a light source component for emitting a light beam,
(B) an optical component for optically modifying and directing the light beam along an optical path toward indicia located in the vicinity of a reference plane exteriorly of the system, and
(C) a photodetector component having a field of view and operative for detecting at least a portion of light of variable intensity reflected off the indicia along a return path, and for generating an electrical signal indicative of the detected light intensity, said arrangement comprising:

the light source component and the optical component being mounted as a unitary assembly, and drive means for directly moving said assembly to cause said light beam to scan the indicia.

26. Arrangement according to claim 25, in which said light source component comprises a laser diode and said optical component comprises a lens and an aperture, said light source and optical components being mounted as said unitary assembly in a barrel, said barrel being mounted on a bracket directly connected to a drive shaft of a motor.

27. Arrangement according to claim 25, in which said photodetector component is mounted to be driven by said drive means with said unitary assembly.

28. Arrangement according to claim 25, in which said unitary assembly is mounted on a bracket directly driven by a drive shaft of a motor, and in which said photodetector component is also mounted on said bracket.

29. Arrangement according to claim 28, including a collection lens mounted on said bracket and operative for collecting and directing the reflected light portion to said photodetector component.

30. Arrangement according to claim 29, in which said light source component is a laser diode, and said optical component comprises a lens and an aperture, and in which said laser diode and said optical component are mounted in a common barrel.

31. Arrangement according to claim 25, in which said photodetector component an elongate inlet at least two spaced apart photodetectors.

32. Arrangement according to claim 31, in which said light source component comprises a laser diode, and said optical component comprises a lens and an aperture, said laser diode and said optical component being mounted in a common barrel mounted on a bracket operatively connected to a drive shaft of a motor, and including a collection lens mounted on said bracket and operative for collecting and directing the reflected light portion to said photodetector component.

* * * * *